(12) United States Patent
Gerard et al.

(10) Patent No.: US 10,704,461 B2
(45) Date of Patent: Jul. 7, 2020

(54) TURBOCHARGED INTERNAL COMBUSTION ENGINE WITH A PORTION OF EXHAUST GASES FROM ENGINE BYPASSING TURBOCHARGER TURBINE FOR RAPID CATALYST LIGHT-OFF WITHOUT WASTE GATE PERFORMANCE PENALTY IN TURBINE

(71) Applicant: Garrett Transportation I Inc., Torrance, CA (US)

(72) Inventors: Arnaud Gerard, Epinal (FR); Damien Marsal, Golbey (FR); Bassam Chammas, Epinal (FR); Andreas Heckner, Remiremont (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 16/145,110

(22) Filed: Sep. 27, 2018

(65) Prior Publication Data

US 2020/0102882 A1    Apr. 2, 2020

(51) Int. Cl.
*F02B 37/18* (2006.01)
*F02B 75/18* (2006.01)
(Continued)

(52) U.S. Cl.
CPC .......... *F02B 37/183* (2013.01); *F02B 37/004* (2013.01); *F02B 37/013* (2013.01); *F02B 75/18* (2013.01); *F02B 2075/1816* (2013.01)

(58) Field of Classification Search
CPC ...... F02B 37/183; F02B 37/013; F02B 75/18; F02B 37/004; F02B 2075/1816
(Continued)

(56) References Cited

U.S. PATENT DOCUMENTS 4,404,804 A    9/1983 Tadokoro et al.
6,276,138 B1    8/2001 Welch
(Continued)

FOREIGN PATENT DOCUMENTS

DE    102013206365 A1    10/2013
DE    102013021401 A1    7/2014
EP    1619365 A1    1/2006

OTHER PUBLICATIONS

Extended European Search in EP Appl. No. 19193227.6-1004, dated Mar. 12, 2020.

*Primary Examiner* — Hoang M Nguyen
(74) *Attorney, Agent, or Firm* — John C. James

(57) ABSTRACT

An engine system includes an internal combustion engine, at least one turbocharger, and a catalytic treatment device. The engine includes an exhaust manifold system having a main exhaust manifold and a bypass exhaust manifold. A partial-engine bypass valve system is positioned between the engine and the exhaust manifold system. The bypass valve system when placed in a non-bypass position directs all of the engine exhaust gases to the turbine wheel of the turbocharger, and after passing through the turbine wheel the gases proceed to the catalytic device. In a bypass position of the bypass valve system, a bypass portion of the total exhaust gases is made to bypass the turbine wheel and proceed to the catalytic device, while the remainder first passes through the turbine wheel before going to the catalytic device.

7 Claims, 11 Drawing Sheets

(51) Int. Cl.
*F02B 37/00* (2006.01)
*F02B 37/013* (2006.01)

(58) Field of Classification Search
USPC .... 60/600, 602, 603, 605.1, 605.2, 611, 612
See application file for complete search history.

(56) References Cited

U.S. PATENT DOCUMENTS

| | | | |
|---|---|---|---|
| 6,519,931 | B2 | 2/2003 | Fujieda et al. |
| 7,426,830 | B2 | 9/2008 | Schorn et al. |
| 8,286,418 | B2 | 10/2012 | Demura |
| 8,516,814 | B2 | 8/2013 | Okada |
| 8,996,281 | B2 | 3/2015 | Gingrich et al. |
| 9,726,074 | B2 | 8/2017 | Onitsuka et al. |
| 2007/0175215 | A1* | 8/2007 | Rowells ............... F02B 29/0418 60/605.2 |
| 2010/0146965 | A1* | 6/2010 | Easley, Jr. ............. F02B 37/001 60/602 |
| 2011/0179770 | A1 | 7/2011 | Schmuck-Soldan |
| 2012/0096856 | A1* | 4/2012 | Rutschmann ......... F01N 13/107 60/612 |
| 2013/0008417 | A1* | 1/2013 | Sankar ................ F02D 41/0047 123/568.12 |
| 2013/0269315 | A1 | 10/2013 | Ervin et al. |
| 2015/0226108 | A1* | 8/2015 | Vroman .................. F28F 9/027 60/605.2 |
| 2015/0322848 | A1* | 11/2015 | Gokhale ................ B61C 5/04 60/602 |

\* cited by examiner

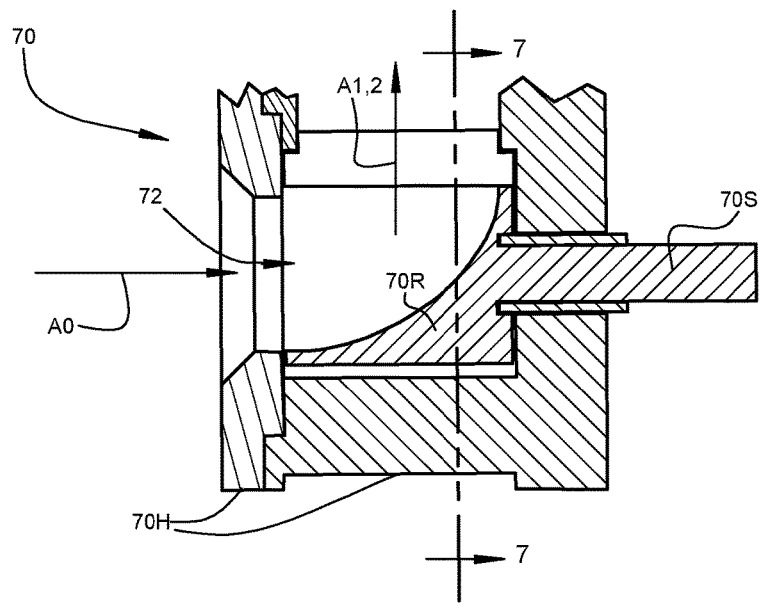
FIG. 6
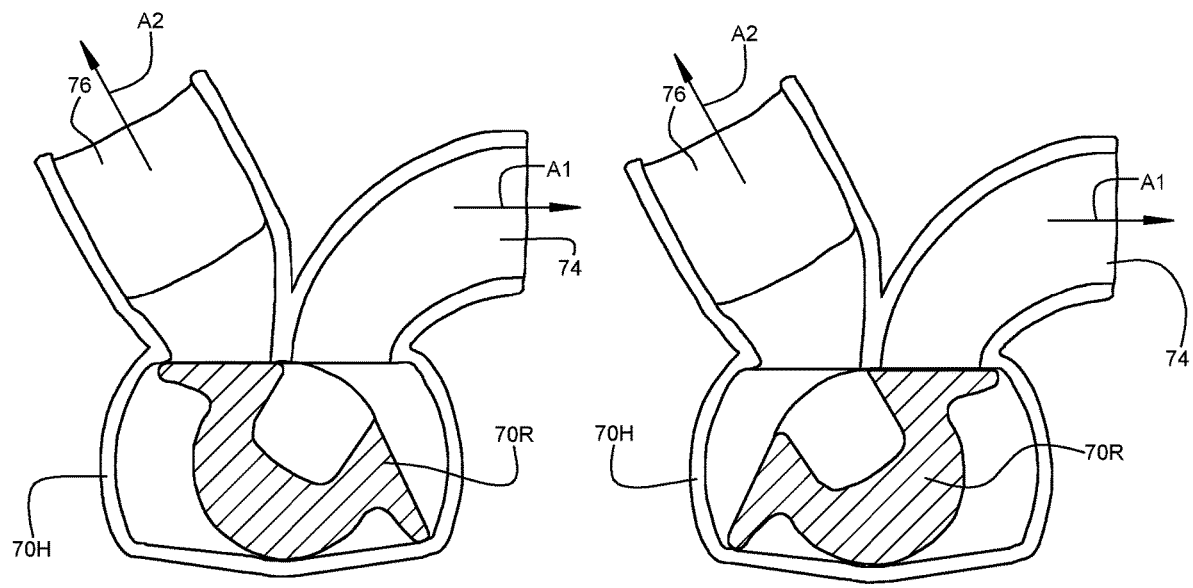
FIG. 7
FIG. 8

TURBOCHARGED INTERNAL COMBUSTION ENGINE WITH A PORTION OF EXHAUST GASES FROM ENGINE BYPASSING TURBOCHARGER TURBINE FOR RAPID CATALYST LIGHT-OFF WITHOUT WASTE GATE PERFORMANCE PENALTY IN TURBINE

BACKGROUND OF THE INVENTION

This application relates generally to turbocharged internal combustion engine systems. The application relates more particularly to such engine systems that employ a catalytic treatment device in the exhaust system.

Turbochargers are employed with some internal combustion engines in order to boost the performance of the engine. Exhaust gases discharged from the cylinders of the engine are collected in an exhaust manifold and are supplied to the turbine of the turbocharger to drive the turbine wheel, which in turn drives the compressor wheel of the turbocharger. The compressor pressurizes air and supplies it to the intake manifold of the engine. The overall pressure ratio across the internal combustion engine is thereby increased, allowing the engine to develop increased torque and power output.

As a result of governmental regulations aimed at reducing harmful exhaust emissions from internal combustion engines, internal combustion engine systems nearly always include a catalytic treatment device (commonly referred to as a catalytic converter) in the exhaust system. Within the catalytic treatment device, the exhaust gases flow through a dense honeycomb structure made from a ceramic that is coated with catalysts such as platinum and palladium. Typically, there are two or more different catalysts, such as one that catalyzes a reduction process to convert nitrogen oxides into nitrogen and oxygen, and another that catalyzes an oxidation process to convert carbon monoxide into carbon dioxide.

There is a minimum temperature (called the "light-off temperature") that the catalysts must be heated to before they become effective to convert the $NO_x$ and CO in the exhaust gases into harmless substances. Consequently, during a "cold start" of the engine (for example, after the vehicle has been parked overnight and is started in the morning), there is a period of time before the catalysts have reached their light-off temperature, during which the catalytic treatment device is not effective. This is a significant problem because it has been estimated that as much as 80 percent of total vehicle engine emissions are caused by engine operation during the cold-start period when the catalytic device is ineffective. It is desired to minimize this time period as much as possible.

The present application describes embodiments of turbocharged internal combustion engine systems that employ advantageous means for achieving rapid light-off of a catalytic treatment device.

SUMMARY OF THE DISCLOSURE

Broadly described, the present application discloses an engine system that includes an internal combustion engine, at least one turbocharger, and a catalytic treatment device. The engine includes an exhaust manifold system having a main exhaust manifold and a bypass exhaust manifold. A partial-engine bypass valve system is positioned between the engine and the turbocharger and catalytic treatment device. The bypass valve system when placed in a non-bypass position directs all of the engine exhaust gases to the turbine wheel of the turbocharger, and after passing through the turbine wheel the gases proceed to the catalytic device. In a bypass position of the bypass valve system, a bypass portion of the total exhaust gases is made to bypass the turbine wheel and proceed to the catalytic device, while the remainder first passes through the turbine wheel before going to the catalytic device.

In accordance with one embodiment of the present invention, an engine system, comprises:

an internal combustion engine having a plurality of cylinders;

an exhaust manifold system comprising a main exhaust manifold that receives exhaust gases from at least some of the cylinders, and a bypass exhaust manifold that receives exhaust gases from at least one of the cylinders;

a bypass line coupled to the bypass exhaust manifold to receive exhaust gases therefrom;

an exhaust gas feed conduit coupled to the main exhaust manifold to receive exhaust gases therefrom;

a first turbocharger comprising a first compressor and a first turbine, the first turbine comprising an exhaust gas inlet coupled to the exhaust gas feed conduit to receive exhaust gases therefrom, and comprising an exhaust gas discharge conduit for discharging exhaust gases that have passed through the first turbine, a downstream end of the bypass line being coupled to the exhaust gas discharge conduit; and a partial-engine bypass valve system disposed between the engine cylinders and the turbocharger, the partial-engine bypass valve system being adjustable to a non-bypass position allowing exhaust gases to flow from at least some of the cylinders into the main exhaust manifold for supply to the first turbine, while preventing exhaust gases from flowing from any of the engine cylinders to the bypass exhaust manifold, the partial-engine bypass valve system being alternatively adjustable to a bypass position allowing exhaust gases to flow from at least some of the cylinders into the main exhaust manifold for supply to the first turbine and allowing exhaust gases to flow from at least one of the cylinders into the bypass exhaust manifold for bypassing the first turbine;

wherein the partial-engine bypass valve system in the bypass position fluidly isolates the main exhaust manifold and the bypass exhaust manifold from each other.

In one embodiment of the invention, the engine cylinders are divided into a first sub-group of cylinders and a second sub-group of cylinders, and the partial-engine bypass valve system comprises a three-way valve having a valve inlet, a first outlet, and a second outlet, wherein the valve inlet is coupled to the bypass exhaust manifold to receive exhaust gases therefrom, the first outlet is coupled to the main exhaust manifold to supply exhaust gases thereinto, and the second outlet is coupled to an upstream end of the bypass line. The three-way valve in the bypass position allows exhaust gases from the first sub-group of cylinders to bypass the first turbine and proceed into the exhaust gas discharge conduit, while exhaust gases from the second sub-group of cylinders pass through the first turbine. The three-way valve in the non-bypass position causes the exhaust gases from all engine cylinders to commingle and pass through the exhaust gas feed conduit.

The invention in this embodiment is applicable to engines of various numbers of cylinders. In one embodiment, the engine has four cylinders, the first sub-group comprising one cylinder and the second sub-group comprising three cylinders. In another embodiment, the engine has six cylinders, the first sub-group comprising two cylinders and the second sub-group comprising four cylinders.

In some embodiments, more than one turbocharger can be employed. For example, in one embodiment there is a second turbocharger comprising a second compressor and a second turbine, the engine system including piping and one or more valves for selectively making both first and second turbochargers active or alternatively for making the first turbocharger active while the second turbocharger is inactive, and wherein the bypass line is arranged such that exhaust gases bypass both the first turbine and the second turbine when the three-way valve is in the bypass position.

In another embodiment of the invention, the partial-engine bypass valve system comprises a main exhaust valve for each of the cylinders and a secondary exhaust valve for at least one of the cylinders. Each secondary exhaust valve is coupled to the bypass exhaust manifold to feed exhaust gases from the respective cylinder into the bypass exhaust manifold when the secondary exhaust valve is open, and each main exhaust valve is coupled to the main exhaust manifold to feed exhaust gases from the respective cylinders into the main exhaust manifold when the main exhaust valves are open. In operation, in the non-bypass position of the bypass valve system, during an exhaust phase of each engine cycle, the bypass exhaust valve(s) remain closed while the main exhaust valves open, and in the bypass position, during an exhaust phase of each engine cycle, the bypass exhaust valve(s) and the main exhaust valves open.

The present inventions includes methods for operating an engine system. In one embodiment, a method is provided for operating an engine system comprising an internal combustion engine having a plurality of cylinders in which an air-fuel mixture is combusted to produce exhaust gases, a turbocharger having a turbine wheel for receiving exhaust gases and a compressor wheel driven by the turbine wheel, and a catalytic treatment device that receives exhaust gases and converts exhaust gas components into less-harmful compounds. The method comprises the steps of:
(a) determining whether or not cold-start conditions exist such that the catalytic treatment device is operating below a light-off temperature at which the catalytic treatment device becomes effective for converting the exhaust components into the less-harmful compounds;
(b) if cold-start conditions are determined not to exist, directing the total amount of exhaust gases from the engine to pass through the turbine wheel before proceeding to the catalytic treatment device; and
(c) if cold-start conditions are determined to exist, directing a bypass portion of a total amount of exhaust gases from the engine to bypass the turbine wheel and proceed to the catalytic treatment device, and directing a remaining portion of the total amount of exhaust gases to pass through the turbine wheel before proceeding to the catalytic treatment device.

In one embodiment, the engine cylinders are divided into a first sub-group of one or more cylinders and a second sub-group of cylinders. Step (b) comprises directing exhaust gases from both the first and second sub-groups of cylinders to the turbine wheel, and step (c) comprises directing exhaust gases from the first sub-group of cylinders to bypass the turbine wheel and proceed to the catalytic treatment device.

Optionally, if cold-start conditions are determined to exist, a cold-start fuel schedule can be employed in the first sub-group of the cylinders while a normal fuel schedule is employed in the second sub-group of the cylinders. A cold-start combustion timing can also be employed in the first sub-group of the cylinders while a normal combustion timing is used in the second sub-group of the cylinders.

In one embodiment, each of the engine cylinders has a main exhaust valve and one or more of the cylinders has an additional bypass exhaust valve. Step (b) then comprises opening both the bypass exhaust valve(s) and the main exhaust valves during an exhaust phase of each engine cycle so that the bypass portion of the total amount of exhaust gases is exhausted through the bypass exhaust valve(s) and fed through a bypass line that bypasses the turbine wheel, and the remaining portion of the total amount of exhaust gases is exhausted through the main exhaust valves and fed to the turbine wheel. Step (c) comprises keeping the bypass exhaust valve(s) closed and opening the main exhaust valves during the exhaust phase of each engine cycle so that the total amount of the exhaust gases is exhausted through the main exhaust valves and fed to the turbine wheel.

BRIEF DESCRIPTION OF THE DRAWINGS

Having described the present disclosure in general terms, reference will now be made to the accompanying drawing (s), which are not necessarily drawn to scale, and wherein:

FIG. 6 is a cross-sectional view of a three-way valve in accordance with one embodiment for use in practicing the invention;

FIG. 7 is a cross-sectional view along line 7-7 in FIG. 6, with the valve in the non-bypass position;

FIG. 8 is similar to FIG. 7, showing the valve in the bypass position;

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
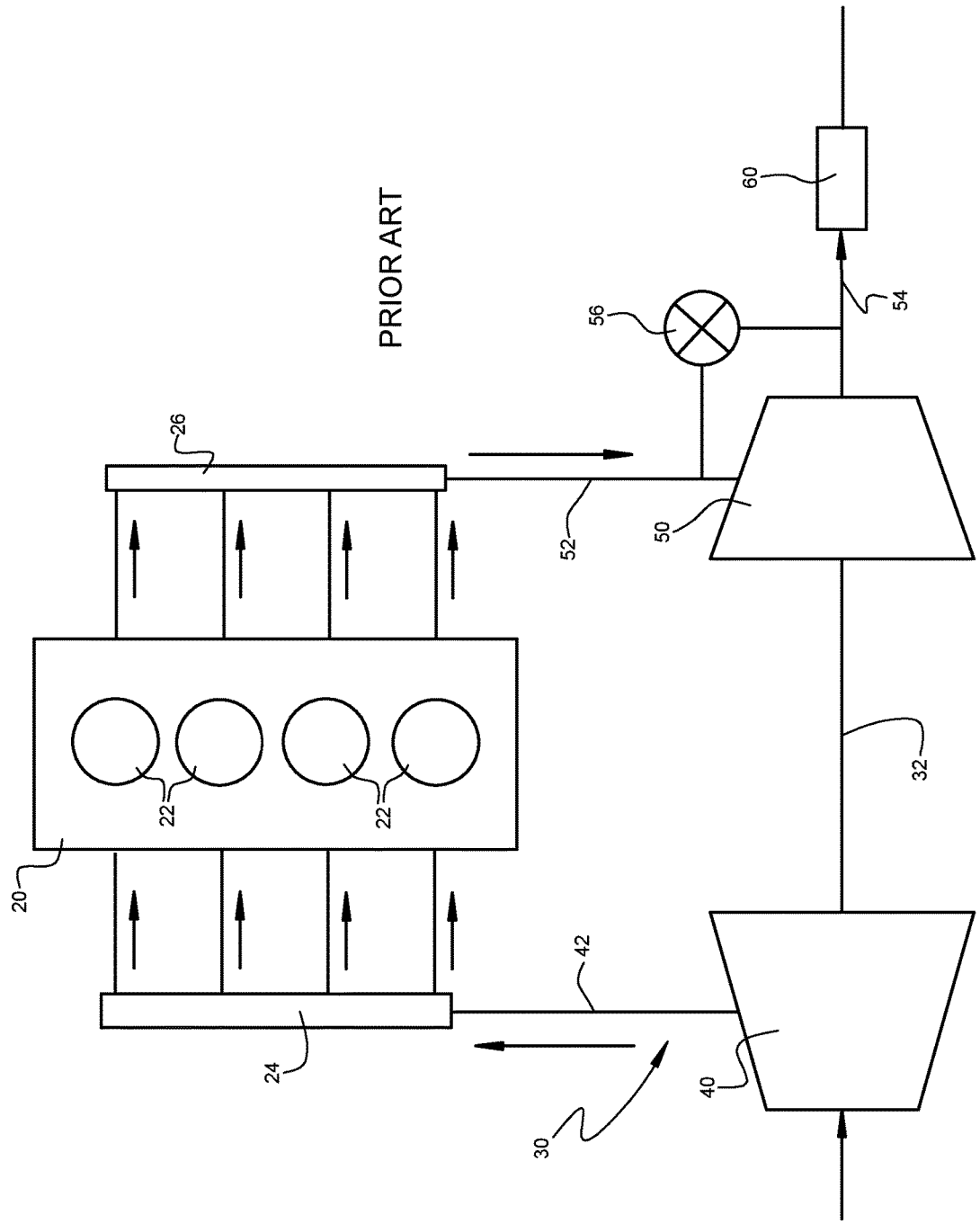
FIG. 1 is a schematic illustration of a turbocharged engine system in accordance with prior art.

FIG. 1 illustrates a turbocharged engine system in accordance with a prior-art arrangement. The engine system includes an internal combustion engine 20 having a plurality of (in the illustrated embodiment, four) cylinders 22. The engine cylinders receive air from an intake manifold 24. A fuel system (not shown) also delivers fuel for introduction into the cylinders. The fuel-air mixture is combusted in the cylinders and the resulting exhaust gases are exhausted from the cylinders into an exhaust manifold 26. The engine system includes a turbocharger 30 for boosting the pressure of the air supplied to the intake manifold 24. The turbocharger comprises a compressor having a compressor wheel 40 mounted on one end of a rotatable shaft 32, and a turbine having a turbine wheel 50 mounted on the other end of the shaft. The compressor wheel 40 is housed within a compressor housing (not shown) that defines an air inlet for directing air into the compressor wheel, and further defines a volute for receiving air that has been pressurized by the compressor wheel. Air is discharged from the volute through suitable piping 42 to the intake manifold 24 of the engine. The turbine wheel 50 is housed within a turbine housing (not shown) that defines an annular scroll or volute for receiving exhaust gases from the exhaust manifold 26, via an exhaust gas feed conduit 52 coupled between the exhaust manifold and an inlet to the turbine housing. Exhaust gases in the scroll are directed through a nozzle into the turbine wheel 50, and the exhaust gases are expanded as they pass through the turbine wheel, thereby rotatably driving the turbine wheel, which in turn drives the compressor wheel 40.

The prior-art engine system includes an exhaust gas discharge conduit 54 that receives the exhaust gases that have passed through the turbine wheel 50. A catalytic treatment device 60 is connected to the exhaust gas discharge conduit. The exhaust gases pass through the catalytic treatment device, where the $NO_x$ and CO components are converted into nitrogen, oxygen, and carbon dioxide, for discharge into the atmosphere.

In some prior-art engine systems such as the one shown in FIG. 1, the problem of excessive emissions during a cold start (because of the time required for the exhaust gases to reach the light-off temperature) is addressed by providing a waste gate 56. The waste gate when closed constrains all of the exhaust gases delivered by the exhaust gas feed conduit 52 to pass through the turbine wheel 50. However, when the waste gate is opened, a portion of the exhaust gases can pass through the waste gate, bypassing the turbine wheel, and enter into the exhaust gas discharge conduit 54 downstream of the turbine wheel. Some waste gates can be adjusted to various degrees of openness, thereby regulating the fractional part of the total exhaust stream that is bypassed around the turbine wheel. In any case, the fact that some fractional part of the exhaust gases do not pass through the turbine wheel means that the temperature of those gases entering the catalytic treatment device 60 is substantially higher than the gases that first have to pass through the turbine wheel. This higher temperature helps speed up the process of catalyst light-off.

The drawback to this approach, however, is that when the waste gate 56 is opened, the pressure ratio across the turbine immediately drops by a significant amount. Thus, as to those exhaust gases that pass through the turbine wheel, the amount of work they can develop in the turbine wheel is significantly reduced. Therefore, turbocharger performance (and consequently engine system performance) is diminished as long as the waste gate remains open.

Figure 2:
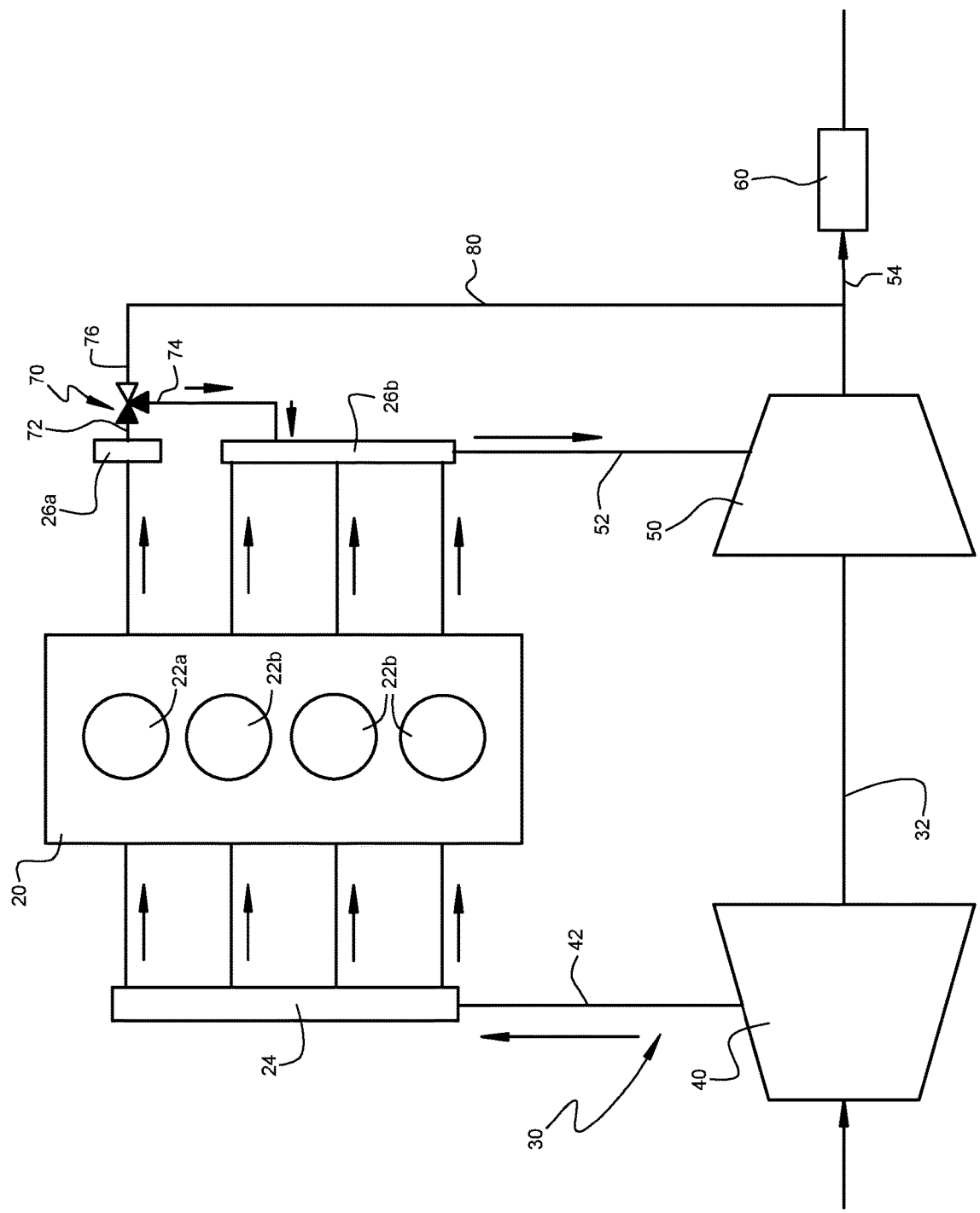
FIG. 2 is a schematic illustration of a turbocharged engine system in accordance with a first embodiment of the invention, with the three-way valve in a non-bypass position.

The present inventions aim to address the light-off issue without as much compromise of turbocharger performance as occurs in some prior-art engine systems. With reference to FIG. 2, a first embodiment of the invention is shown. The engine 20 has four cylinders 22 fed with air from an intake manifold 24, and includes a turbocharger 30 whose compressor wheel 40 pressurizes the air delivered into the intake manifold, as in the system of FIG. 1. The turbine wheel 50 of the turbocharger receives exhaust gases via an exhaust gas feed conduit 52 and discharges the exhaust gases via an exhaust gas discharge conduit 54 as in the prior system. However, unlike the prior system, the engine 20 in the system according to the first embodiment of the invention has its cylinders 22 divided into two sub-groups. A first sub-group (in this embodiment having a single cylinder 22a) discharges exhaust gases into a bypass exhaust manifold 26a, and a second sub-group (in this embodiment having three cylinders 22b) discharges its exhaust gases into a separate main exhaust manifold 26b. The system further includes a bypass line 80 for exhaust gases to bypass the turbine wheel.

Figure 3:
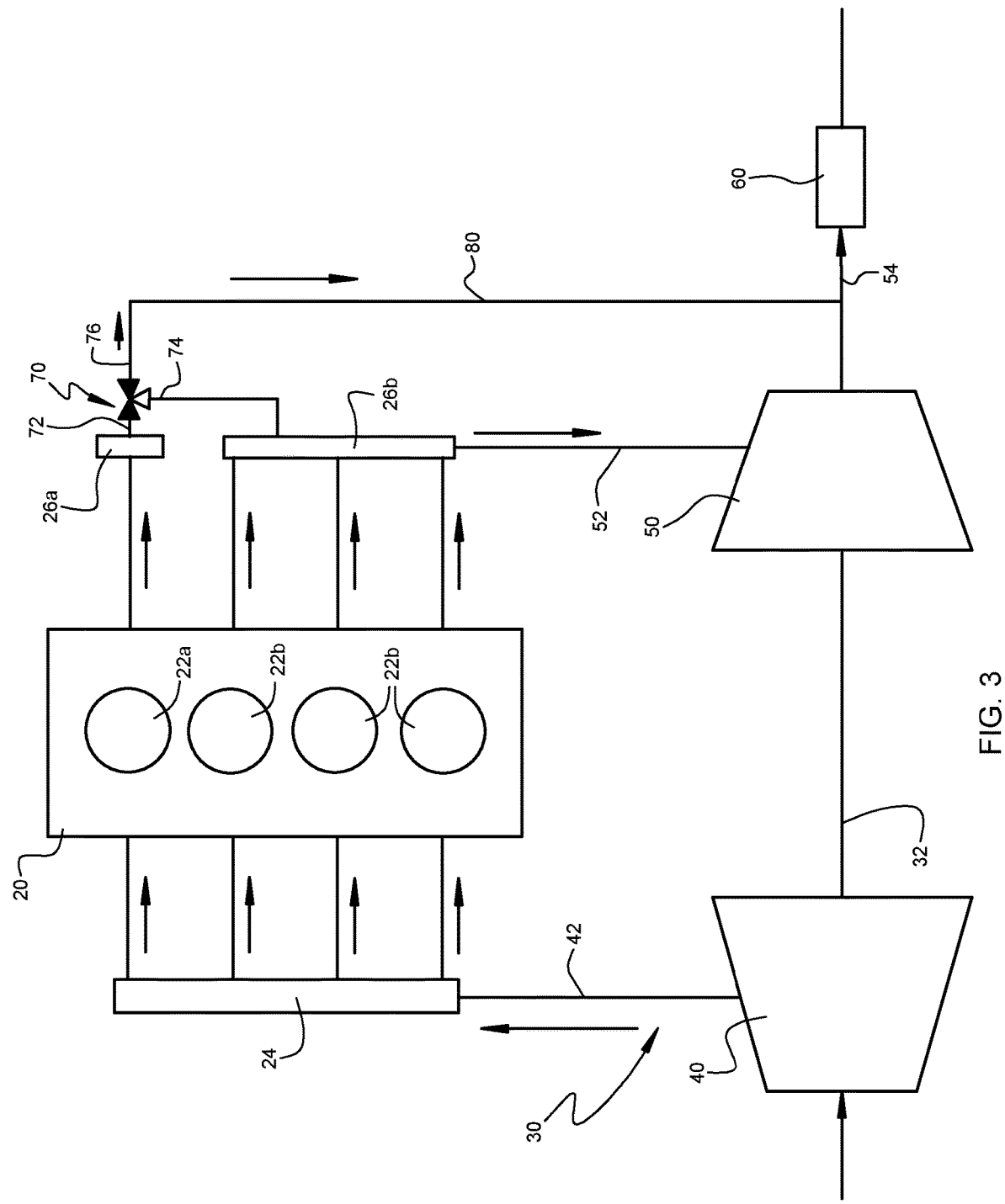
FIG. 3 shows the engine system of the first embodiment, with the three-way valve in a bypass position.

Systems in accordance with the invention include a partial-engine bypass valve system operable for causing a portion of the total engine exhaust gases to bypass the turbine wheel during cold-start conditions. In the embodiment of FIGS. 2 and 3, the partial-engine bypass valve system comprises a three-way valve 70 having a valve inlet 72, a first outlet 74, and a second outlet 76. The valve inlet 72 is coupled to the bypass exhaust manifold 26a to receive exhaust gases therefrom, the first outlet 74 is coupled to the main exhaust manifold 26b to supply exhaust gases thereinto, and the second outlet 76 is coupled to an upstream end of the bypass line 80.

The three-way valve 70 is adjustable to a non-bypass position (FIG. 2) in which a flow path is opened from the valve inlet 72 to the first outlet 74, while the second outlet 76 is closed. In this non-bypass position, the three-way valve establishes fluid communication between the two exhaust manifolds 26a and 26b so that they function essentially as a single manifold, similar to a typical exhaust manifold. The three-way valve in the non-bypass position causes the exhaust gases from all engine cylinders 22a and 22b to commingle and pass through the exhaust gas feed conduit 52 to the turbine wheel.

The three-way valve 70 alternatively can be placed in a bypass position (FIG. 3) in which a flow path is opened from the valve inlet 72 to the second outlet 76, while the first outlet 74 is closed. In this bypass position, the valve 70 provides fluid isolation between the two exhaust manifolds 26a and 26b, and the exhaust gases from the first sub-group comprising cylinder 22a are fed through the bypass line 80, while the exhaust gases from the second sub-group of cylinders 22b are fed through the exhaust gas feed conduit 52 to the turbine wheel 50.

The downstream end of the bypass line 80 is coupled into the exhaust gas discharge conduit 54 at a position downstream of the turbine wheel 50 and upstream of the catalytic treatment device 60. Accordingly, when the three-way valve is in the bypass position, the exhaust gases from the first sub-group of engine cylinders bypass the turbine wheel and proceed directly into the exhaust gas discharge conduit and then into the catalytic treatment device. In this manner, the invention enables improved turbine performance relative to turbochargers with waste gates, because the exhaust gases driving the turbine wheel do not experience a pressure drop caused by an open waste gate. In this regard, a key aspect of the systems in accordance with embodiments of the invention is that the three-way valve fluidly isolates the two exhaust gas streams coming respectively from the two engine cylinder sub-groups. Therefore, the path of lower resistance (i.e., the flow path from the bypass exhaust manifold 26a, through the valve inlet 72 to the second outlet 76 and into the bypass line 80) is fluidly isolated from the path of higher resistance (i.e., the flow path from the main exhaust manifold 26b through the exhaust gas feed conduit 52 and through the turbine wheel 50). This is in contrast to a waste gate, wherein the waste gate opens a second path (bypassing the turbine wheel) while still leaving the first path (through the turbine wheel) in fluid communication with the second path. The turbine performance penalty thus caused by waste gates is what the present invention aims to substantially mitigate or eliminate entirely.

At the same time, the direct path of exhaust gases from the first engine cylinder sub-group to the catalytic treatment device helps to speed up the light-off of the catalyst, similar to the effect of a conventional waste gate.

Figure 4:
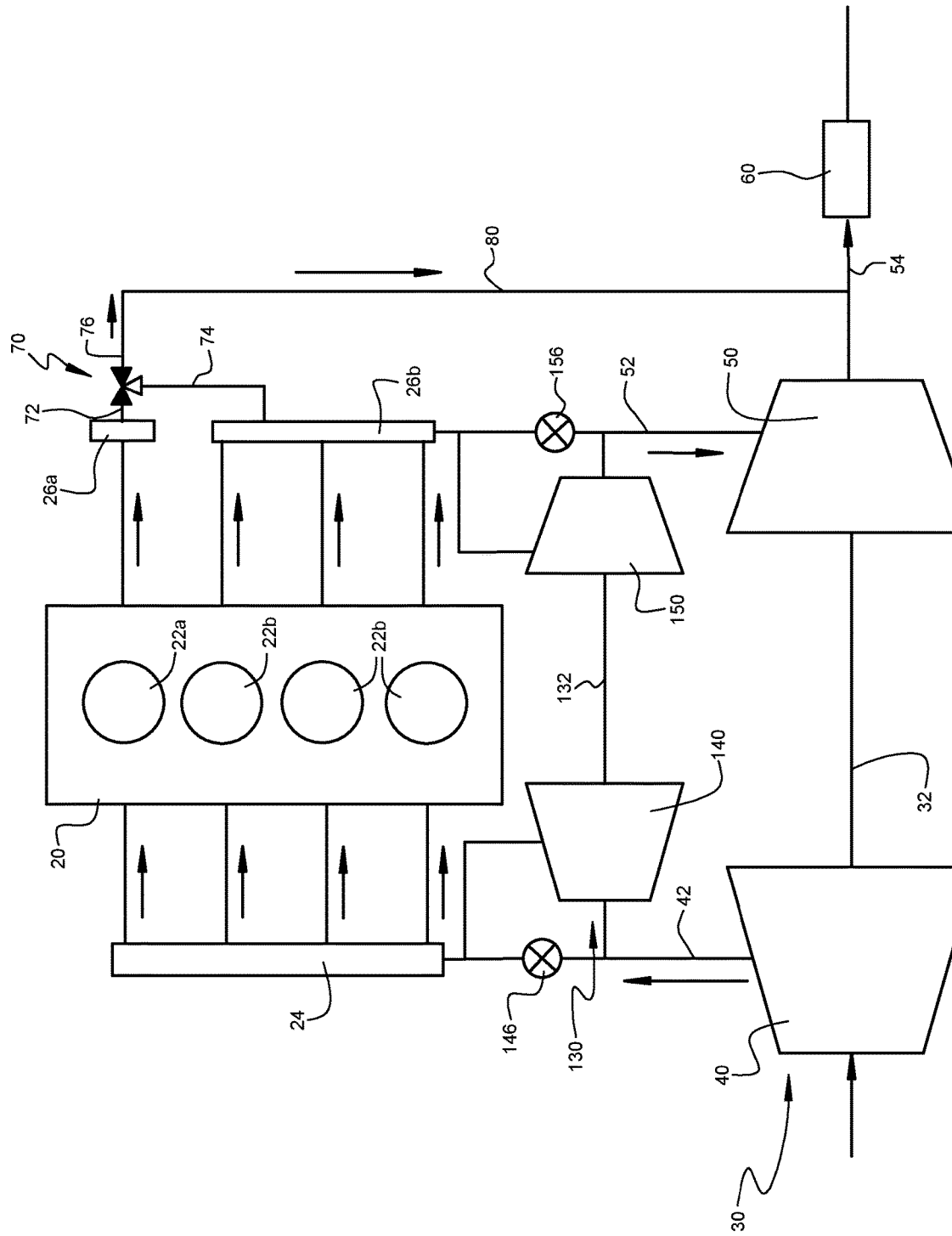
FIG. 4 is a schematic illustration of a turbocharged engine system in accordance with a second embodiment of the invention, showing the three-way valve in the bypass position.

The present invention is applicable to a variety of engine system layouts. FIG. 4 illustrates a second embodiment of the invention. The engine system of the second embodiment is similar in many respects to that of the first embodiment, the chief difference being that instead of having a single turbocharger, the engine system of FIG. 4 has a twin-turbocharger design. In particular, the engine system of the second embodiment includes a first turbocharger 30 and a second turbocharger 130 arranged in a series relationship to each other. Thus, the first (low-pressure) compressor wheel 40 of the first turbocharger pressurizes air and supplies it to the inlet of the second (high-pressure) compressor wheel 140 of the second turbocharger, which further pressurizes the air and delivers it to the engine intake manifold 24. On the turbine side, the second (high-pressure) turbine wheel 150 of the second turbocharger partially expands the exhaust gases and supplies them to the first (low-pressure) turbine wheel 50 of the first turbocharger, which further expands the exhaust gases and discharges them through the exhaust gas discharge conduit 52.

As is common in twin-turbocharger engine layouts, the engine system of FIG. 4 includes a compressor bypass valve 146 that can be opened so that most of the air from the first compressor wheel 40 will bypass the second compressor wheel 140. Correspondingly, the turbine side includes a turbine bypass valve 156 that can be opened so that most of the exhaust gases will bypass the second turbine 150 and proceed directly to the first turbine wheel 50. The compressor and turbine bypass valves enable the engine system to be operated in either a single-stage mode or a two-stage serial mode, depending on engine operating conditions.

In the embodiment of FIG. 4, when the three-way valve 70 is placed in the bypass position, the exhaust gases from the bypass exhaust manifold 26a' bypass both turbines and proceed directly to the catalytic treatment device 60, while the exhaust gases from the main exhaust manifold 26b pass through the second turbine 150 and then the first turbine 50 (when in two-stage serial mode), or through the first turbine 50 (when in single-stage mode) before going to the catalytic treatment device. In an alternative embodiment shown in FIG. 4A, the bypass line 80 is arranged to bypass only the second turbine 150. That is, instead of the downstream end of the bypass line 80 connecting into the exhaust gas discharge conduit 54 after the first turbine wheel 50, its downstream end connects into the exhaust gas feed conduit 52 between the two turbines.

Figure 4A:
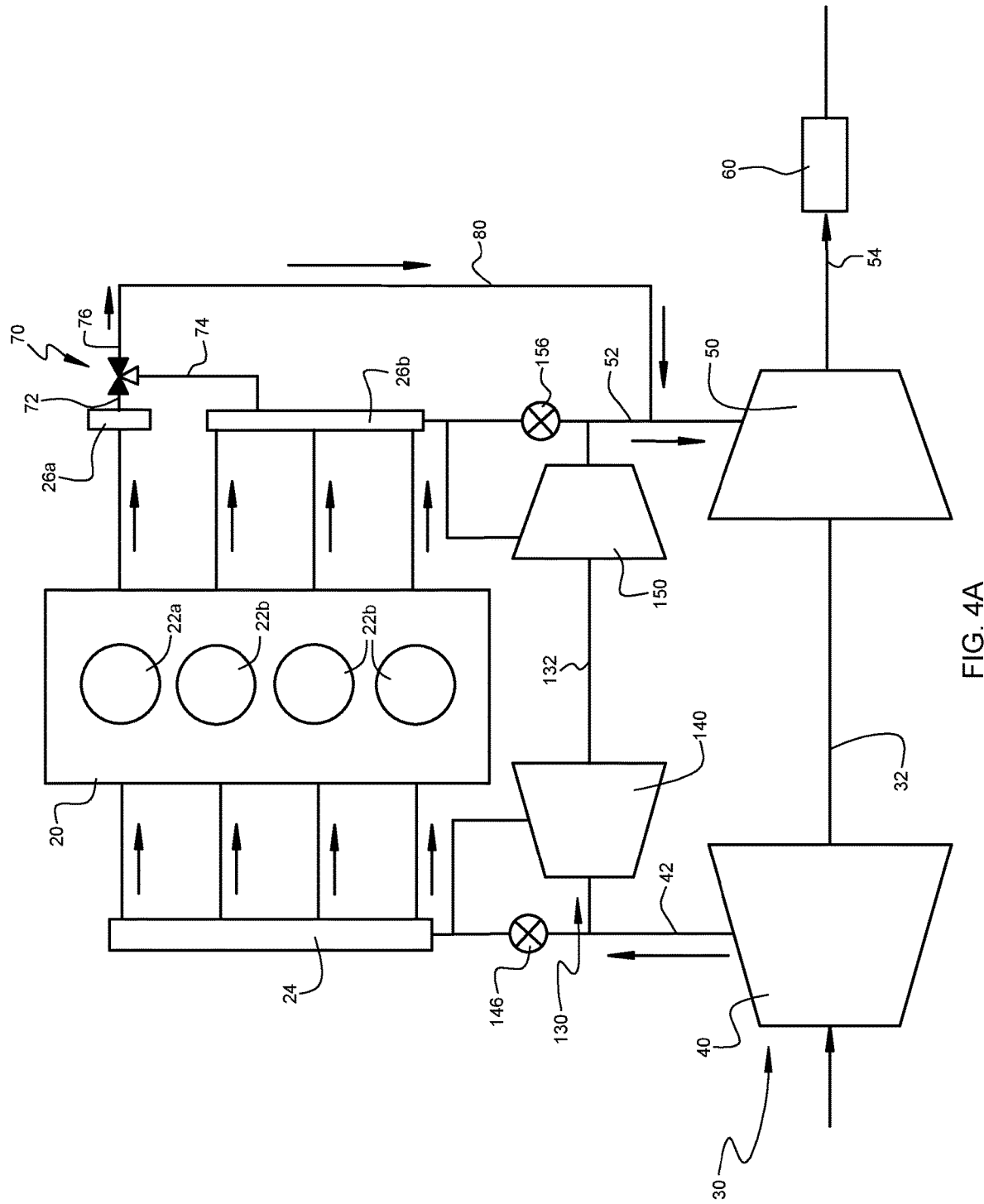
FIG. 4A is a schematic illustration of a turbocharged engine system in accordance with the second embodiment of the invention but slightly modified relative to the FIG. 4 version, showing the three-way valve in the bypass position.

While FIGS. 4 and 4A show a twin-turbo engine layout in which the turbochargers are in a serial arrangement, it is also within the scope of the invention for the turbochargers to be arranged in parallel with each other.

Figure 5:
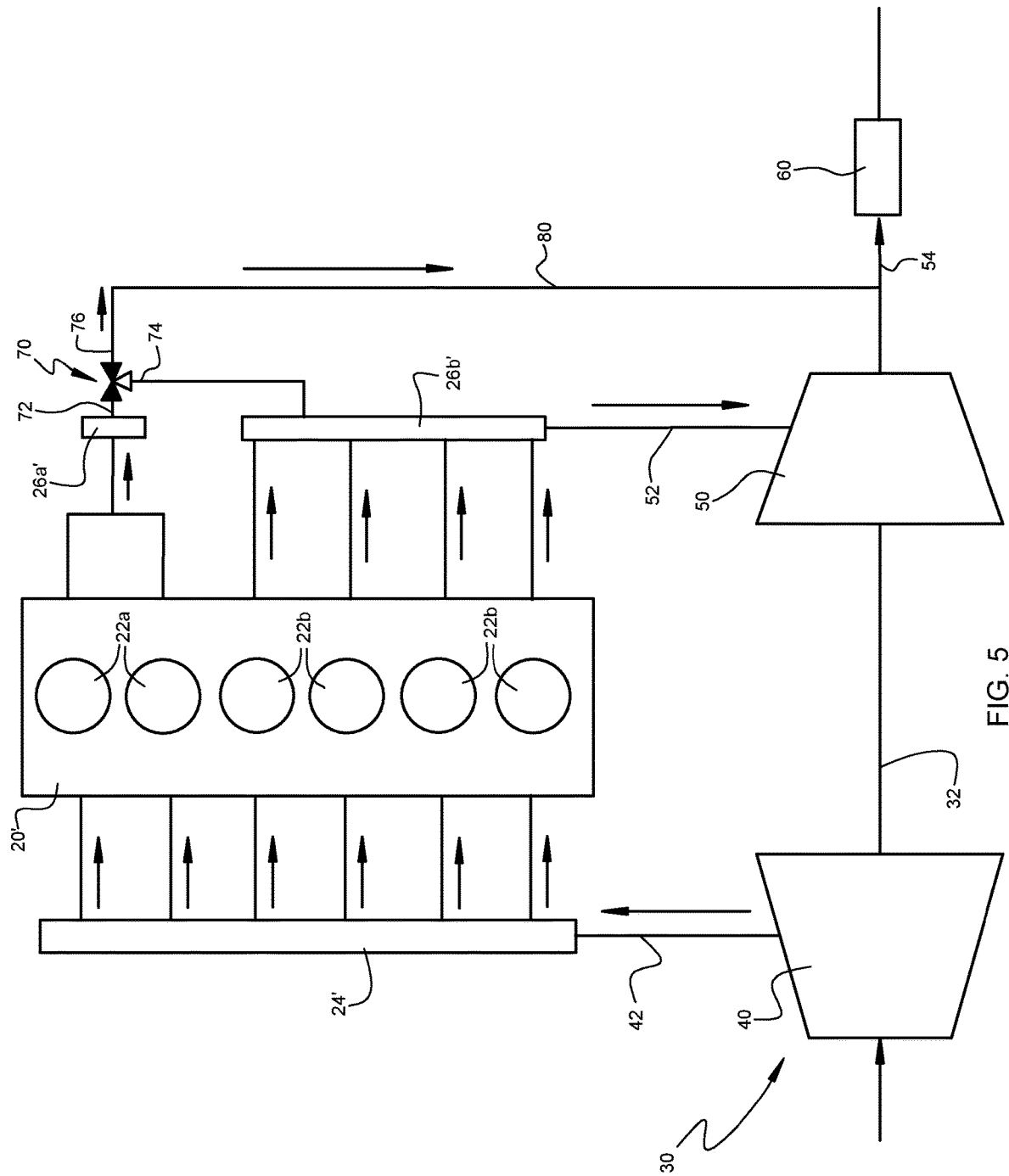
FIG. 5 is a schematic illustration of a turbocharged engine system in accordance with a third embodiment of the invention, showing the three-way valve in the bypass position.

The invention is not limited to any particular number of engine cylinders. Thus, FIG. 5 shows a third embodiment of the invention. The engine system of FIG. 5 is generally similar to that of FIGS. 2 and 3, except that instead of having a 4-cylinder engine, the engine system of FIG. 5 has a 6-cylinder engine. A further difference relates to how the engine cylinders are divided into sub-groups. In the engine system of the third embodiment, the first sub-group has two cylinders 22a, which feed their exhaust gases into a bypass exhaust manifold 26a', and the second sub-group has four cylinders 22b feeding their exhaust gases into a main exhaust manifold 26b'. In terms of how the three-way valve 70 operates, however, the engine system of the third embodiment is substantially similar to the first embodiment described above.

FIGS. 6 through 8 depict one embodiment of a three-way valve 70 that can be used in practicing the present inventions. The valve comprises a valve housing 70H that contains a valve member or rotor 70R having an actuator shaft 70S protruding out from the housing. The valve rotor is rotatable about an axis defined by the shaft, so that the valve rotor can be placed alternatively in either a first position (FIG. 7) or a second position (FIG. 8). Exhaust gases enter the valve 70 along a direction or axis A0. The valve rotor and housing are configured to turn the flow through substantially 90 degrees so that the exhaust gases exit the valve either through the first outlet 74 along a first axis A1 (when the valve rotor is in the first position of FIG. 7) or alternatively through the second outlet 76 along a second axis A2 (when the valve rotor is in the second position of FIG. 8). As previously described, exhaust gases from the first engine cylinder sub-group enter the valve through the inlet 72. When the valve rotor is in the first (non-bypass) position of FIG. 7, the gases exit from the first outlet 74 and are fed into the main exhaust manifold so that they are commingled with the exhaust gases from the second sub-group of engine cylinders. When the valve rotor is in the second (bypass) position of FIG. 8, the gases exit from the second outlet 76 and are fed through the bypass line 80 (see any of FIGS. 2 through 5) directly to the catalytic treatment device.

As already noted, a key aspect of the three-way valve 70 is that the flow path from the inlet 72 to the first outlet 74 is fluidly isolated from the flow path from the inlet 72 to the second outlet 76, as apparent from FIGS. 7 and 8. The result is that when the valve is in the non-bypass position of FIG. 7, the valve establishes fluid communication between the main and exhaust exhaust manifolds such that they collectively behave substantially like a single manifold. However, when the valve is in the bypass position, the two exhaust manifolds are fluidly isolated from each other as previously described. This fluid isolation means that the exhaust gases from the main exhaust manifold are delivered to the turbine(s) of the turbocharger(s) without suffering a pressure drop as occurs with systems having a conventional waste gate.

Figure 9:
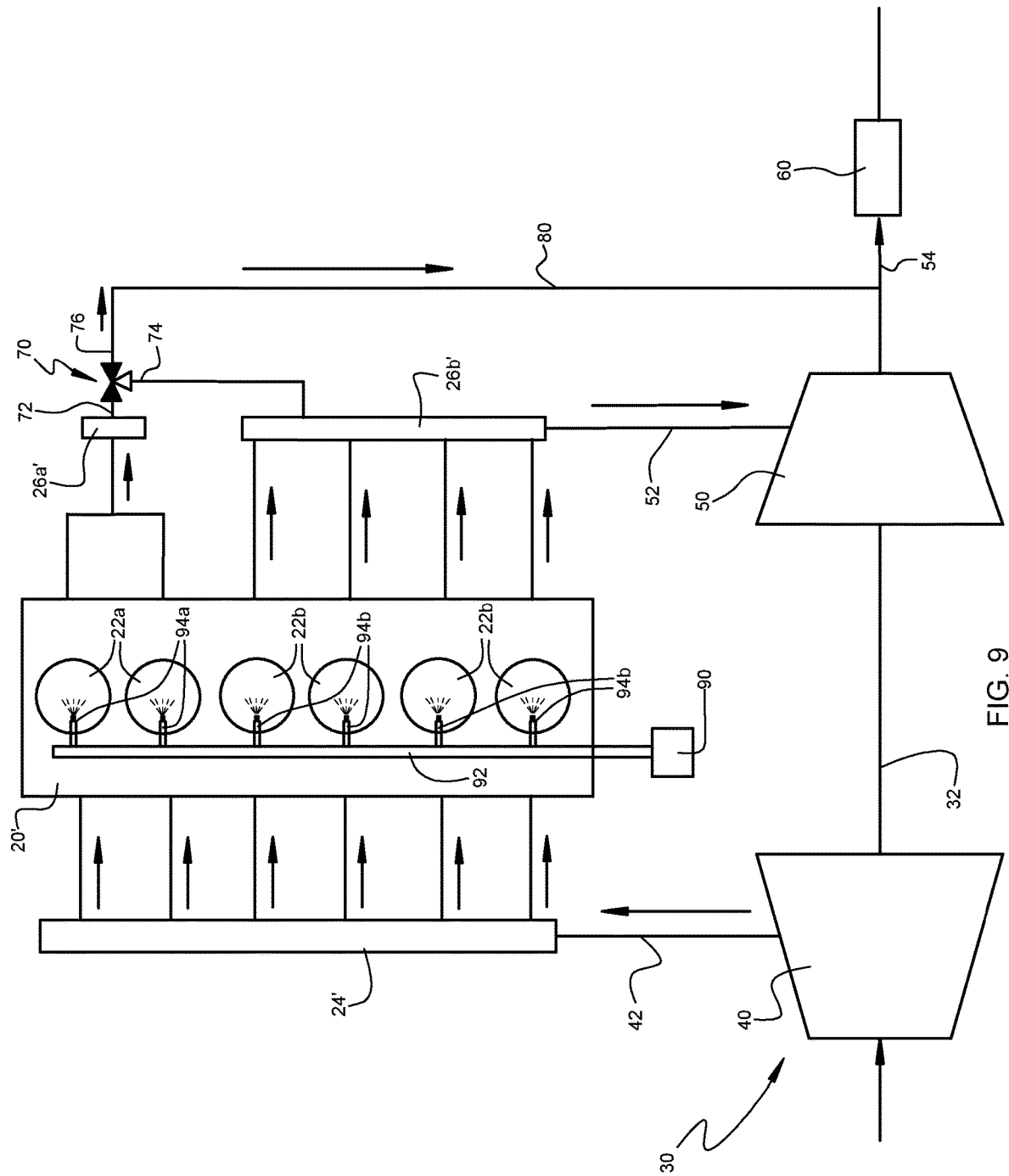
FIG. 9 is a schematic illustration of a turbocharged engine system in accordance with a fourth embodiment of the invention.

FIG. 9 depicts a fourth embodiment of the invention. The engine system of the fourth embodiment is similar to the third embodiment of FIG. 5, the chief difference relating to how fuel control and/or combustion timing are performed in each of the first sub-group of cylinders 22a and the second sub-group of cylinders 22b. FIG. 9 depicts a fuel controller 90 (inclusive of a fuel pump and control unit for regulating fuel delivery by the pump) for feeding fuel through a fuel rail 92 to electronically controlled fuel injectors 94a and 94b that spray fuel into the cylinders. (Alternatively there can be two separate fuel rails for the two groups of fuel injectors.) In accordance with this embodiment, the fuel delivery schedule for the first sub-group of cylinders 22a via first fuel injectors 94a can differ from the fuel delivery schedule for the second sub-group of cylinders 22b via the second fuel injectors 94b. Additionally, the respective combustion timings within the two sub-groups of cylinders can differ from each other. For example, retarding the spark in the first sub-group's cylinder(s) can provide a late burn and produce higher exhaust gas temperatures. In this manner, the temperature and/or pressure of the exhaust gases discharged from the first sub-group of cylinders 22a during a cold start can be controlled independently of the temperature and/or pressure of the exhaust gases discharged from the second sub-group of cylinders 22b.

Figure 10:
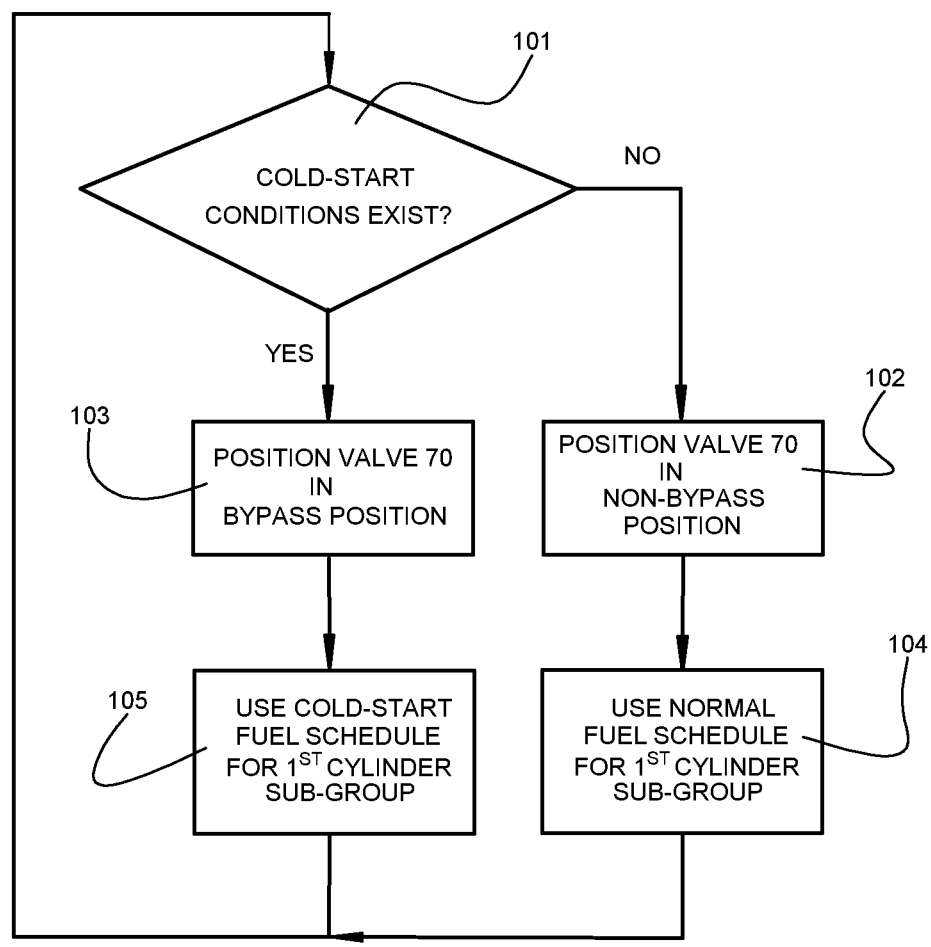
FIG. 10 is a flow chart of a method in accordance with an embodiment of the invention.

A method in accordance with one embodiment of the invention is shown in flow chart form in FIG. 10. A decision step 101 queries whether cold-start conditions exist. There are various ways that cold-start conditions can be detected. For example, one technique is to determine how much time has elapsed since the last operation of the engine, and if the elapsed time exceeds a predetermined amount, then it is assumed that the catalytic device has cooled to below its light-off temperature. Upon startup of the engine, it can then be assumed that cold-start conditions will continue for a predetermined period of time. Alternatively, a temperature measurement can be made at a suitable location, such as on or inside the catalytic device, and cold-start conditions can be determined based on an empirical correlation between the measured temperature and the level of emissions from the tailpipe of the engine, such that cold-start conditions are assumed as long as the measured temperature is below a predetermined limit.

In any case, if cold-start conditions are found to exist in the query step 101, then at step 103 the three-way valve is placed (or allowed to remain) in the bypass position. Optionally, at step 105, an altered cold-start fuel schedule (and possibly an altered cold-start combustion timing) can be employed for the first sub-group of engine cylinders whose exhaust gases will be fed directly to the catalytic treatment device, while a normal fuel schedule and normal combustion timing are used in the second sub-group of the cylinders. The method then returns to query step 101 for the next iteration. If at some point the query step 101 yields a "no" result such that cold-start conditions no longer exist, then at step 102 the three-way valve is placed (or allowed to remain) in the non-bypass position, and at step 104 a normal fuel schedule is employed for the first sub-group of cylinders.

Figure 11:
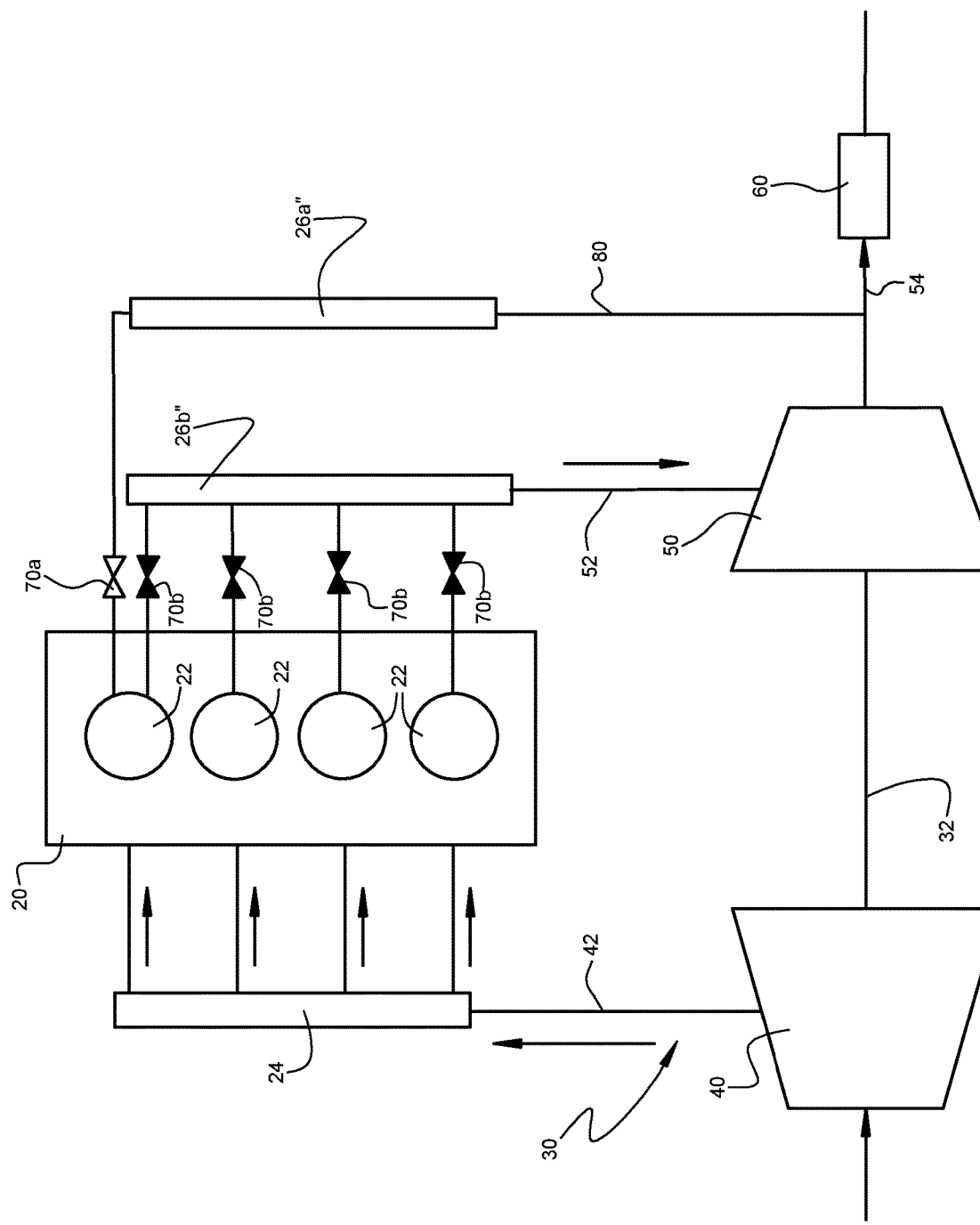
FIG. 11 is a schematic illustration of a turbocharged engine system in accordance with a fifth embodiment of the invention, showing the partial-engine bypass valve system in the non-bypass position.
Figure 12:
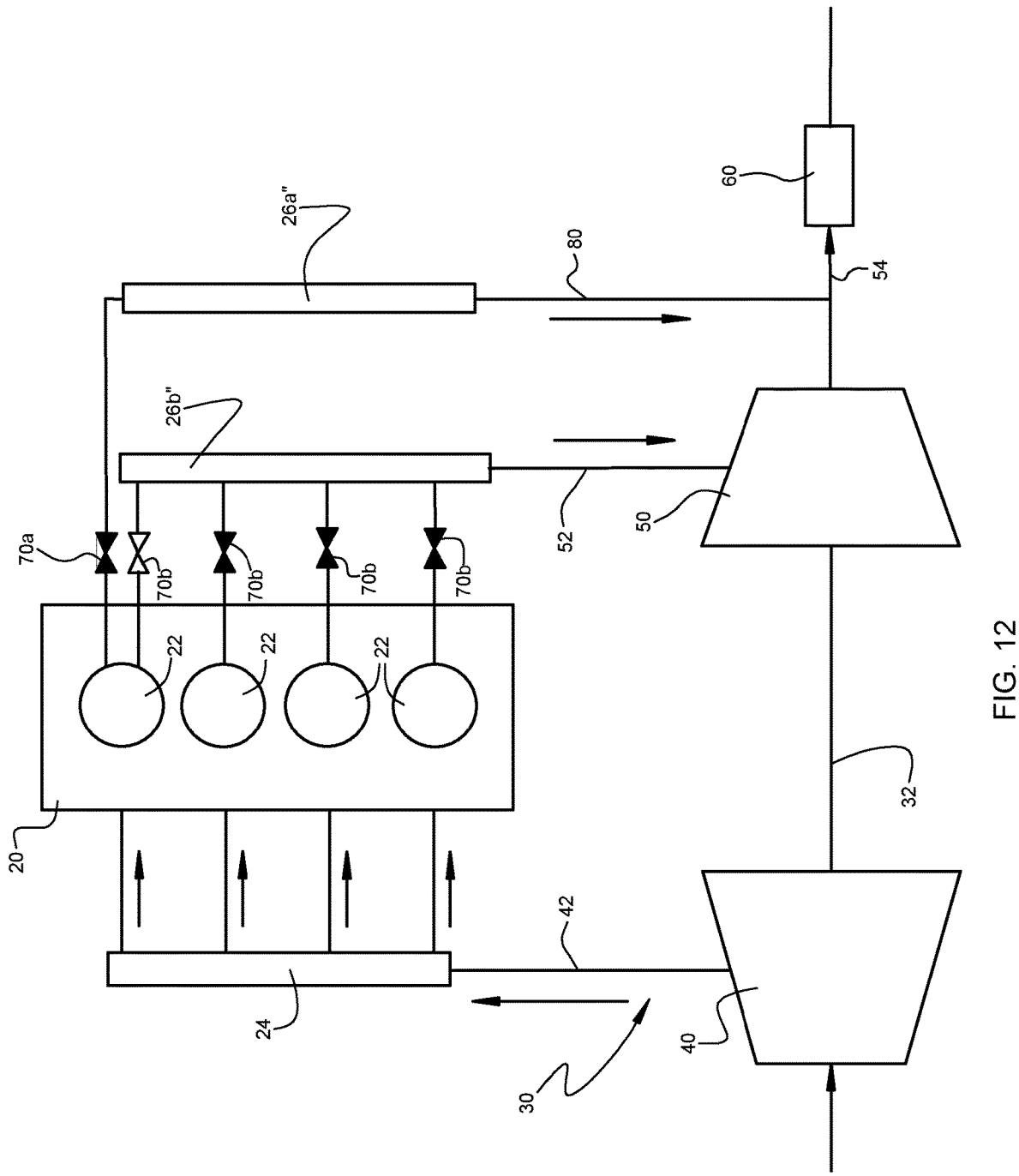
FIG. 12 is similar to FIG. 11, showing the partial-engine bypass valve system in the bypass position.

FIGS. 11 and 12 illustrate an engine system in accordance with a fifth embodiment of the invention. While previous embodiments employ a partial-engine bypass valve system in the form of a three-way valve 70 positioned between the main and bypass exhaust manifolds, the engine system of the fifth embodiment accomplishes a similar result through special dual exhaust valves in one or more engine cylinders, the two exhaust valves per cylinder being actuated independently of each other. Thus, a four-cylinder engine is shown, each cylinder having a main exhaust valve 70b. In addition, at least one cylinder has a bypass exhaust valve 70a. The illustrated embodiment has a single cylinder that includes the additional bypass exhaust valve. Variable camming is operable to open and close the main exhaust valve 70b during the exhaust phase of each engine cycle as usual, and to open and close, or keep closed, the bypass exhaust valve 70a during each exhaust phase. FIG. 11 depicts the state of the exhaust valves during an exhaust phase when it is desired for all of the engine exhaust gases to be fed to the turbine wheel 50. The main exhaust valves 70b open but the bypass exhaust valve 70a is kept closed. Therefore, all engine exhaust gases are exhausted through the main exhaust valves, into the main exhaust manifold 26b", from which they are fed to the turbine wheel. This corresponds to the non-bypass position of the partial-engine bypass valve system.

FIG. 12 shows the engine system with the partial-engine bypass valve system in the bypass position, such as would be used during cold-start conditions. During the exhaust phase of each engine cycle, for each cylinder having a bypass exhaust valve 70a, the bypass exhaust valve is opened but the main exhaust valve 70b is kept closed. For the other cylinders having only the main exhaust valves, they are opened as usual. Accordingly, one portion of the total exhaust gases are exhausted through the bypass exhaust valve(s) 70a, into the bypass exhaust manifold 26a", from which they are fed through the bypass line 80 to bypass the turbine wheel. The remainder of the exhaust gases are exhausted through the main exhaust valves 70b into the main exhaust manifold 26b", from which they are fed to the turbine wheel. Thus, the valve system of this embodiment achieves similar results as the prior embodiments, but without requiring a separate three-way valve.

In the embodiment shown in FIGS. 11 and 12, only one of the engine cylinders has the extra bypass exhaust valve 70a. Alternatively, however, it is within the scope of the invention for a plurality of the engine cylinders to have the extra bypass exhaust valves.

The present inventions are applicable to many different types of internal combustion engines, including diesel, gasoline, natural gas, etc. While embodiments having one turbocharger or two turbochargers have been illustrated, the invention is not so limited; the invention can be practiced with engine systems having more than two turbochargers (arranged serially or in parallel).

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:
1. An engine system, comprising:
an internal combustion engine having a plurality of cylinders, wherein the engine cylinders are divided into a first sub-group of cylinders and a second sub-group of cylinders;
an exhaust manifold system comprising a main exhaust manifold that receives exhaust gases from the second sub-group of cylinders, and a bypass exhaust manifold that receives exhaust gases from the first sub-group of cylinders;
a bypass line coupled to the bypass exhaust manifold to receive exhaust gases therefrom;
an exhaust gas feed conduit coupled to the main exhaust manifold to receive exhaust gases therefrom;

a first turbocharger comprising a first compressor and a first turbine, the first turbine comprising an exhaust gas inlet coupled to the exhaust gas feed conduit to receive exhaust gases therefrom, and comprising an exhaust gas discharge conduit for discharging exhaust gases that have passed through the first turbine, a downstream end of the bypass line being coupled to the exhaust gas discharge conduit; and a partial-engine bypass valve system disposed between the engine cylinders and the turbocharger, the partial-engine bypass valve system defining a non-bypass position and a bypass position, and comprising a three-way valve having a valve inlet, a first outlet, and a second outlet, wherein the valve inlet is coupled to the bypass exhaust manifold to receive exhaust gases therefrom, the first outlet is coupled to the main exhaust manifold to supply exhaust gases thereinto, and the second outlet is coupled to an upstream end of the bypass line, the three-way valve in the non-bypass position allowing exhaust gases to flow from the first sub-group of cylinders directly into the main exhaust manifold while preventing exhaust gases from flowing from any of the engine cylinders to the bypass line via the bypass exhaust manifold, such that the exhaust gases from all engine cylinders commingle and pass through the exhaust gas feed conduit for supply to the first turbine, wherein the three-way valve in the bypass position allows exhaust gases from the first sub-group of cylinders to bypass the first turbine and proceed into the exhaust gas discharge conduit, while exhaust gases from the second sub-group of cylinders flow into the main exhaust manifold for supply to the first turbine.

2. The engine system of claim 1, further comprising a catalytic treatment device coupled to the exhaust gas discharge conduit to receive exhaust gases therefrom.

3. The engine system of claim 1, wherein the engine has four cylinders, the first sub-group comprising one cylinder and the second sub-group comprising three cylinders.

4. The engine system of claim 1, wherein the engine has six cylinders, the first sub-group comprising two cylinders and the second sub-group comprising four cylinders.

5. The engine system of claim 1, further comprising a second turbocharger comprising a second compressor and a second turbine, the engine system including piping and one or more valves for selectively making both first and second turbochargers active or alternatively for making the first turbocharger active while the second turbocharger is inactive, and wherein the bypass line is arranged such that exhaust gases bypass both the first turbine and the second turbine when the three-way valve is in the bypass position.

6. The engine system of claim 1, further comprising a second turbocharger comprising a second compressor and a second turbine, the engine system including piping and one or more valves for selectively making both first and second turbochargers active or alternatively for making the first turbocharger active while the second turbocharger is inactive, and wherein the bypass line is arranged such that exhaust gases bypass only the second turbine when the three-way valve is in the bypass position.

7. An engine system, comprising:

an internal combustion engine having a plurality of cylinders, wherein the engine cylinders are divided into a first sub-group of cylinders and a second sub-group of cylinders, each cylinder of both first and second sub-groups of cylinders having a main exhaust valve for discharging exhaust gases from the cylinders;

an exhaust manifold system comprising a main exhaust manifold that receives exhaust gases from the second sub-group of cylinders, and a bypass exhaust manifold that receives exhaust gases from the first sub-group of cylinders;

a bypass line coupled to the bypass exhaust manifold to receive exhaust gases therefrom;

an exhaust gas feed conduit coupled to the main exhaust manifold to receive exhaust gases therefrom;

a first turbocharger comprising a first compressor and a first turbine, the first turbine comprising an exhaust gas inlet coupled to the exhaust gas feed conduit to receive exhaust gases therefrom, and comprising an exhaust gas discharge conduit for discharging exhaust gases that have passed through the first turbine, a downstream end of the bypass line being coupled to the exhaust gas discharge conduit; and a partial-engine bypass valve system disposed between the engine cylinders and the turbocharger, the partial-engine bypass valve system defining a non-bypass position and a bypass position, wherein the partial-engine bypass valve system comprises a bypass exhaust valve for each cylinder of the first sub-group of cylinders, each bypass exhaust valve being coupled to the bypass exhaust manifold to feed exhaust gases from the first sub-group of cylinders into the bypass exhaust manifold when the bypass exhaust valve is open, each main exhaust valve being coupled to the main exhaust manifold to feed exhaust gases from the all cylinders into the main exhaust manifold when the main exhaust valves are open, wherein in the non-bypass position, during an exhaust phase of each engine cycle, the bypass exhaust valve(s) remain closed while the main exhaust valves open, such that exhaust gases from the first sub-group of cylinders flow directly into the main exhaust manifold and exhaust gases from the second sub-group of cylinders flow directly into the main exhaust manifold for supply to the first turbine, while exhaust gases are prevented from flowing from any of the engine cylinders to the bypass exhaust manifold, wherein in the bypass position, during an exhaust phase of each engine cycle, the bypass exhaust valve(s) of the first sub-group of cylinders and the main exhaust valves of the second sub-group of cylinders open, while the main exhaust valve(s) of the first sub-group of cylinders closes, such that exhaust gases from the first sub-group of cylinders flow into the bypass exhaust manifold and thereby bypass the first turbine, and exhaust gases from the second sub-group of cylinders flow into the main exhaust manifold for supply to the first turbine.

* * * * *